(12) United States Patent
Ishakian et al.

(10) Patent No.: US 10,656,979 B2
(45) Date of Patent: May 19, 2020

(54) STRUCTURAL AND TEMPORAL SEMANTICS HETEROGENEOUS INFORMATION NETWORK (HIN) FOR PROCESS TRACE CLUSTERING

(71) Applicant: INTERNATIONAL BUSINESS MACHINES CORPORATION, Armonk, NY (US)

(72) Inventors: Vatche Ishakian, Belmont, MA (US); Vinod Muthusamy, Peekskill, NY (US); Aleksander Slominski, Riverdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 446 days.

(21) Appl. No.: 15/482,488

(22) Filed: Apr. 7, 2017

(65) Prior Publication Data
US 2017/0286190 A1 Oct. 5, 2017

Related U.S. Application Data

(63) Continuation-in-part of application No. 15/087,488, filed on Mar. 31, 2015.

(51) Int. Cl.
*G06F 9/54* (2006.01)
*G06F 16/901* (2019.01)
*G06Q 10/06* (2012.01)

(52) U.S. Cl.
CPC .......... *G06F 9/542* (2013.01); *G06F 16/9024* (2019.01); *G06Q 10/0633* (2013.01)

(58) Field of Classification Search
CPC ...................................................... G06F 9/542
See application file for complete search history.

(56) References Cited

U.S. PATENT DOCUMENTS

| 8,000,953 B2 | 8/2011 | Bell, Jr. et al. |
| 8,095,830 B1 | 1/2012 | Cohen et al. |
| | (Continued) | |

OTHER PUBLICATIONS

"Ranking-based Clustering on General Heterogenous Information Networks by Network Projection" (Shi et al., 2014) (Year: 2014).*

(Continued)

*Primary Examiner* — Nicholas P Celani
(74) *Attorney, Agent, or Firm* — F. Chau & Associates, LLC

(57) ABSTRACT

A method of generating process trace clusters includes receiving a set of process traces, where a process trace is an application level event log from a computer system; receiving an identification of node types and edge types of the application event log to generate a heterogeneous information network (HIN) graph, where a temporal node type value is a difference between a current system time and a reference timestamp divided by a user chosen time granularity parameter, performing dimension reduction of the HIN to generate clusters of new event types, generating a set of meta-paths that connect nodes of a same reduced event type in the application event log, calculating similarities between process traces using the new event type clusters, and clustering the set of process traces to generate a plurality of disjoint graph models of processes in the application event log based on the clusters of new event types.

14 Claims, 5 Drawing Sheets

(56) References Cited

U.S. PATENT DOCUMENTS

| | | | |
|---|---|---|---|
| 8,452,735 | B2 | 5/2013 | Mandagere et al. |
| 8,538,909 | B2 | 9/2013 | Ranganath et al. |
| 8,694,516 | B2 | 4/2014 | Cheng |
| 8,832,682 | B2 | 9/2014 | Xu et al. |
| 8,892,493 | B2 | 11/2014 | Aull et al. |
| 9,100,289 | B2 | 8/2015 | Mehta et al. |
| 9,324,038 | B2 | 4/2016 | Charif et al. |
| 2009/0132448 | A1 | 5/2009 | Eder |
| 2014/0058789 | A1 | 2/2014 | Doehring et al. |
| 2014/0096249 | A1* | 4/2014 | Dupont ............ G06F 21/00 726/23 |
| 2014/0297240 | A1 | 10/2014 | Duftler et al. |
| 2014/0298341 | A1 | 10/2014 | Duftler et al. |
| 2015/0019298 | A1 | 1/2015 | Curbera et al. |
| 2015/0127588 | A1 | 5/2015 | Lakshmanan et al. |
| 2015/0142707 | A1 | 5/2015 | Charif et al. |
| 2015/0180755 | A1 | 6/2015 | Zhang et al. |
| 2015/0254158 | A1 | 9/2015 | Puri et al. |
| 2016/0125094 | A1 | 5/2016 | Li et al. |
| 2016/0224458 | A1 | 8/2016 | Spiridonov et al. |
| 2017/0111245 | A1* | 4/2017 | Ishakian ............ G06Q 10/0633 |
| 2017/0286190 | A1 | 10/2017 | Ishakian et al. |

OTHER PUBLICATIONS

"Social Influence Based Clustering of Heterogeneous Information Networks" (Zhou et al., 2013) (Year: 2013).*

"Integrating Meta-Path Selection with User-Guided Object Clustering in Heterogeneous Information Networks" (Sun et al., 2012) (Year: 2012).*

"Process Trace Clustering: A Heterogeneous Information Network Approach" (Nguyen et al, Society for Industrial and Applied Mathematics, Jun. 30, 2016) (Year: 2016).*

Qing Liu, et al., "Towards Semantic Comparison of Multi-Granularity Process Traces," Knowledge-Based Systems 52 (2013), pp. 91-106.

Gianluigi Greco, et al., "Discovering Expressive Process Models by Clustering Log Traces," IEEE Transactions on Knowledge and Data Engineering, vol. 18, No. 8, Aug. 2006, pp. 1010-1027.

R.P. Jagadeesh Chandra Bose, et al., "Trace Clustering based on Conserved Patterns: Towards Achieving Better Process Models," http://www.processmining.org/_media/publications/jcbose2009c.pdf, Processmining.org.

U.S. Office Action dated Feb. 7, 2018 for U.S. Appl. No. 15/087,488.

U.S. Office Action for U.S. Appl. No. 15/087,488.

\* cited by examiner

STRUCTURAL AND TEMPORAL SEMANTICS HETEROGENEOUS INFORMATION NETWORK (HIN) FOR PROCESS TRACE CLUSTERING

CROSS REFERENCE TO RELATED UNITED STATES APPLICATION

This application is a continuation-in-part of U.S. application Ser. No. 15/087,488 of Ishakian, et al., filed Mar. 31, 2016, the contents of which are herein incorporated by reference in their entirety.

TECHNICAL FIELD

Embodiments of the present disclosure are directed to process mining, and more specifically to using temporal semantics in addition to structural information of event logs.

DISCUSSION OF THE RELATED ART

Real-life business processes can be very complex, continuously evolving due to changes in circumstances and conditions, and continuously improving over time. Valuable insights can be gained and process improvements can be made by finding points in time where potential changes happened. Process mining is the task of extracting information from event logs, such as those generated from business process management, workflow management or enterprise resource planning (ERP) systems, to discover models of the underlying processes, organizations, and products. As the event logs often contain a large variety of process executions, the discovered models become more difficult to comprehend because of their complexity and inaccuracy. Traces clustering is among approaches that can address this issue by splitting the event logs into smaller subsets and applying process discovery algorithms to each subset, so that the discovered processes of the subsets are less complex and more accurate.

With advances in information technology, the world is becoming more digital and there are more and more real-world processes being executed electronically using information systems, including online shopping, airline ticket reservations, loan application processing, and various administrative procedures. These applications generate large volumes of data about the processes in the form of event logs that correspond to execution instances of a process. Each process instance corresponds to a trace that is an ordered list of activities or events, invoked by a process instance during its execution. With such data, it is possible perform process mining on the event logs to discover, i.e., to understand what is happening, monitor, i.e., to see if the executions follow what was agreed upon, and improve the processes, e.g., to redesign the process to avoid bottlenecks.

To perform these mining tasks, a process model, which is a graphical representation of a process, is obtained from the event logs. However, as the real-world processes often have high dimensionality, i.e., a large number of event types, and are flexible in terms of their executions, the event logs can contain a large variety of process instances. As a result, the discovered process models become more challenge to comprehend because of their complexity and inaccuracy, such that these models are usually referred to as spaghetti-like models. To address this situation, a common approach is to first do trace clustering to divide the event logs into smaller subsets, and then, discover the process model on each subset of traces. The motivation is that the traces in each subset are more coherent and similar to each other, and thus, the process model discovered from each subset will be less complex and more accurate.

The major focus of trace clustering has typically been on using the structural information of event logs to outline similarities between processes. Augmenting structural information with temporal semantics provides additional benefits that otherwise may not be available by only using the structural information, such as detecting potential drifts in the process execution, and discovering different versions of the process model (process evolution) across time.

SUMMARY

A method of generating process trace clusters includes receiving a set of process traces, where a process trace is an application level event log from a computer system; receiving an identification of node types and edge types of an application event log to generate a heterogeneous information network (HIN) graph of the application event log, where node types of the HIN include events, traces and temporal nodes, where each trace is a finite sequence of event type nodes, where a temporal node type value is set to be a difference between a current system time and a reference timestamp, divided by a user chosen time granularity parameter, performing dimension reduction of the HIN by reducing a number of event types of the set of input traces to generate clusters of new event types, generating a set of meta-paths that connect nodes of a same reduced event type in the application event log, calculating similarities between process traces using the new event type clusters, and clustering the set of process traces to generate a plurality of disjoint partitions based on the clusters of new event types, where each partition is a graph model of a process in the application event log.

According to a further embodiment of the disclosure, the method includes repeating the steps of receiving an identification of node types and edge types, generating a set of meta-paths, performing dimension reduction, calculating similarities, and clustering the set of process traces using one of the plurality of disjoint partitions as input.

According to a further embodiment of the disclosure, edge types of the HIN are associated with different types of interactions between different node types, where an edge relationship between a trace node type and a temporal node type includes a starts-on edge that indicates a start time of a trace, an ends-on edge that indicates an end time of a trace, and a joined-on edge that indicates a time when a particular resource became available to a trace.

According to a further embodiment of the disclosure, calculating similarities between process traces using the new event type clusters comprises calculating one or more of a structural metapath between similar new event type clusters and a temporal metapath between similar new event type clusters.

According to a further embodiment of the disclosure, a structural path similarity between each pair of events type clusters connected by a meta-path P is calculated using $$\sigma_P(e_j, e_k) = \frac{2 \times |\Gamma_P(e_j, e_k)|}{|\Gamma_P(e_j, e_j)| + |\Gamma_P(e_k, e_k)|},$$

where $e_j$ and $e_k$ represent event-type clusters and $\Gamma_P(e_j, e_k)$ is a set of paths from $e_j$ to $e_k$ following meta-path P, and $|\Gamma_P(\ )|$ represents a cardinality of the set of paths represented by $\Gamma_P(\ )$.

According to a further embodiment of the disclosure, a temporal path similarity between each pair of events type clusters connected by a meta-path P is calculated from SeqPathSim(x,y) of traces x=($a_1$, $a_2$, . . . , $a_m$) and y=($b_1$, $b_2$, . . . , $b_n$), where $a_i$, $b_i$ are event type clusters, where SeqPathSim(x,y) generates a matrix $v_{mn}$(x,y) defined by $$v_{m,n}(x, y) = \begin{cases} v_{m-1,n-1}(x, y) & \text{for } a_m = b_n, \\ \min_v & \text{for } a_m \neq b_n, \end{cases}$$

$$\text{with: } \min_v = \begin{cases} v_{m-1,n}(x, y) + \sigma_{P_{EE}}(a_m, b_n) \\ v_{m,n-1}(x, y) + \sigma_{P_{EE}}(a_m, b_n) \\ v_{m-1,n-1}(x, y) + \sigma_{P_{ERE}, P_{ETE}}(a_m, b_n) \end{cases}.$$

According to a further embodiment of the disclosure, the method includes combining meta-path similarities using the following formula: $\sigma^*(x,y) = \Sigma_{P_i} w_i \times \sigma_{P_i}(x,y)$, where $\sigma_{P_i}(x,y)$ is a similarity between two traces x and y via meta-path $P_i$, and $w_i$ is a weight associated with meta-path $P_i$.

According to a another embodiment of the disclosure, there is provided a non-transitory program storage device readable by a computer, tangibly embodying a program of instructions executed by the computer to perform the method steps for generating process trace clusters.

DETAILED DESCRIPTION OF EXEMPLARY EMBODIMENTS

Figure 1A:
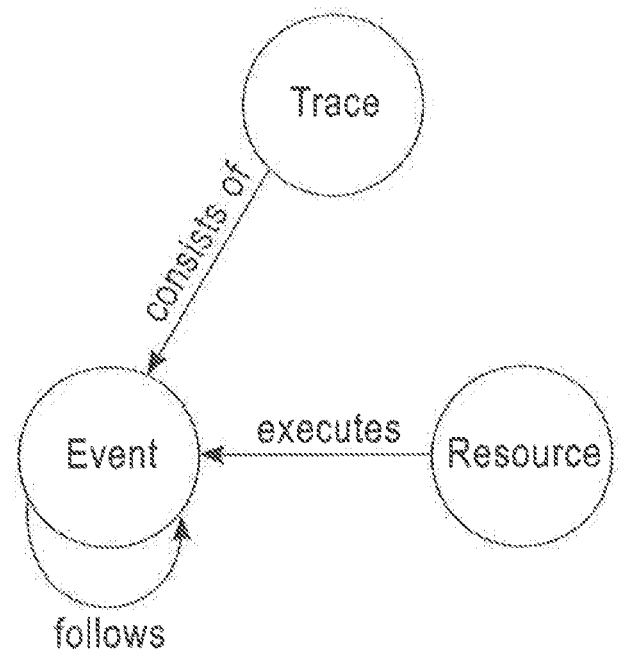
FIG. 1(a) illustrates model process traces as a heterogeneous graphs, according to embodiments of the disclosure.

Exemplary embodiments of the disclosure as described herein generally include methods for using temporal semantics to process traces clustering. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure. In addition, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Business processes can be extremely complex and continuously evolve due to changes in circumstances and conditions. Examples include changes in business or governmental policies, changes in season—e.g., Christmas vs. summer, new technology adoption, increased exposure in social networks, changes of management, disasters, mergers, etc. Valuable insights can be gained about a process and improvements can be suggested by analyzing the evolution of a process and detecting points in time where such changes occurred. Analyzing process evolution can also provide users with a fresh perspective and a new way to reason about process models when they are based on particular periods.

In patent application Ser. No. 15/087,488, "Process Traces Clustering: A Heterogeneous Information Network Approach", filed on Mar. 31, 2016, the contents of which are herein incorporated by reference in their entirety, the inventors of the present disclosure proposed leveraging the rich semantic meaning of structural types of nodes and edges to derive better process-specific features. The disclosure of application Ser. No. 15/087,488 outlined a meta path-based similarity measure for sequences of event logs and introduced a new dimensionality reduction technique that combines topical similarity with regularization by process model structure to deal with event logs of high dimensionality, and showed through experimental evaluation that methods according to embodiments of application Ser. No. 15/087,488 outperformed state of the art trace clustering approaches in both accuracy, performance, and structural complexity metrics, and are thus more humanly readable.

Embodiments of the present disclosure extend the set of structural semantics to include temporal semantics for HINs. Embodiments of the present disclosure provide methods to model a process start time as a meta-path in a heterogeneous information network (HIN), and extend a trace clustering framework of embodiments of application Ser. No. 15/087,488 to utilize temporal and/or structural semantics. Other types of temporal information can also be similarly modeled. By using process temporal semantics according to embodiments of the disclosure, users can detect potential drifts in the process execution, and discover different versions of a process model across time, i.e., track the process evolution. For example, embodiments of the disclosure can detect that loans submitted on a Friday tend to get rejected, that patients discharged on a weekend tend to be readmitted, or that orders placed to a particular manufacture took longer than orders placed two months ago, perhaps due to new regulations in that country that were previously not known. Furthermore, the flexibility of a framework according to embodiments of the disclosure allows users to cluster their business processes either by exclusively selecting temporal semantics, or exclusively selecting structural semantics, or a weighted combination of both.

Preliminaries

A process trace is a finite sequence of events t=($e_1$, $e_2$, . . . , $e_n$). The number of events per trace n may differ from trace to trace. For each event e in a trace t, there is an associated resource r∈R that generates/executes the event, with R being the set of all resources. Events have a start time and, depending on the application domain, an end time.

A heterogeneous information network is an information network or graph with multiple types of nodes (vertices) and/or multiple types of links (edges).

DEFINITION 1: A Heterogeneous Information Network (HIN) is a directed graph G=(V, E) with a node type mapping function φ: V→A, where A, |A|>1, is the set of node types, and a edge type mapping function ψ:E→R, where R, |R|>1, is the set of edge types.

An example of an HIN is bibliographic network that contains multiple types of nodes, such as papers (P), venues (C), authors (A), and multiple types of edges, such as submission (i.e., between P and C), citation (i.e., between P and P), etc.

Multiple paths may exist between two nodes in an HIN. A meta-path, described by a sequence of relations in the HIN that connect two types of nodes, can capture the underlining semantic of each path. For example, APA may represent the co-author relationship between authors, or ACP may represent a paper submission relationship.

To measure similarity between nodes in HINs, existing similarity measures, such as a random walk-based similarity, can be applied to the projected homogeneous network. However, existing measures favor objects with high degree or high connectivity. A similarity measure was proposed that takes advantage of the rich semantic structure in the network and captures the true peer similarity between nodes in HINs.
DEFINITION 2: Given a symmetric meta-path P, a path similarity (PathSim) between two objects of the same type x and y via meta-path P, denoted as $\sigma_P(x; y)$, is defined as:

$$\sigma_P = \frac{2 \times |\Gamma_P(x, y)|}{|\Gamma_P(x, x)| + |\Gamma_P(y, y)|},$$

where $\Gamma_P(x,y)$ is the set of paths from x to y following metapath P.

Task Definition

Consider a set of process traces T. Each trace t∈T includes a finite sequence of events $t=(e_1, e_2, \ldots, e_n)$, $e_i \in E$, n>0, where E is the set of all event types. The number of events per trace n may be different from trace to trace. For each event $e_i$ in a trace t, there is an associated resource $r_i \in R$ that generates/executes the event, with R being the set of all resources.

As highlighted above, discovering process models using the entire set of process traces may result in spaghetti-like model. Clustering process traces T into non-overlapping subsets $\{T_i\}$ of clusters, resulted in clusters that better represent the underlying process model.

Unlike classic data clustering tasks, where the objective is either maximizing the precision and recall, in case ground-truth labels are available, or minimizing the intra-cluster and maximizing the inter-cluster distances, in case the ground-truth labels are not available, the effectiveness of clustering results in process mining is measured by how traces in resulting clusters can generate process models that have (1) a high degree of fitness, which quantifies how the discovered model can accurately reproduce the process instances from the event logs, and (2) low degree of structural complexity. Embodiments use two widely used metrics in other process traces clustering work: (1) weighted average fitness, denoted as AvgFitness; and (2) weighted average structural complexity, denoted as AvgComplexity, as the clustering quality metrics, where the weights are based on the size of each resulting cluster. Formally, the process trace clustering task is defined as follows:
DEFINITION 3: Let T be a set of process traces, E a set of events, and R a set of resources. A process traces clustering is a k-partition $\{T_i\}$ of T, k≥2: $|\{T_i\}|=k$; $T_i \cap T_j = \emptyset$, $\forall 1 \leq i, j \leq k$ that maximizes the average fitness AvgFitness($\{T_i\}$), and minimizes the average structural complexity AvgComplexity($\{T_i\}$).

Similar to other clustering tasks, the effectiveness of process trace clustering results largely depend on how one defines the notion of similarity between traces.

According to embodiments, a similarity measure sim is derived that can be used with off-the-shelf clustering algorithms to produce results of high fitness and low structural complexity. Let $C_{sim}^k(T)=\{T_i\}$ be the k-clustering result of process traces T by applying clustering algorithm C using similarity measure sim on T. Formally, the task is defined as follows:
DEFINITION 4. Let T be a set of process traces, E a set of events, R a set of resources, and C a clustering algorithm. A process trace similarity is a trace similarity measure sim($t_i$; $t_j$), ($t_i$, $t_j$)∈T that maximizes the AvgFitness and minimizes the AvgComplexity of clustering result $C_{sim}^k(T)$.

Modeling Process Traces as HIN

Motivated by the ability of using HIN to capture the peer similarity between nodes in other domain, embodiments of the present disclosure model process traces as a heterogeneous graph G=(V, E), as shown in FIG. 1(a), with the set of nodes V=T∪E∪R that includes three node types: trace, event, and resource. The set of edges E outline different types of interactions between different node types. Embodiments define the following non-limiting list of edge types R:
consist-of: An event is a part of a trace;
follow-up: An event follows another event in a trace;
execute: An event is executed/generated by a resource;
responsible-for: A resource is responsible for a trace.

Figure 1B:
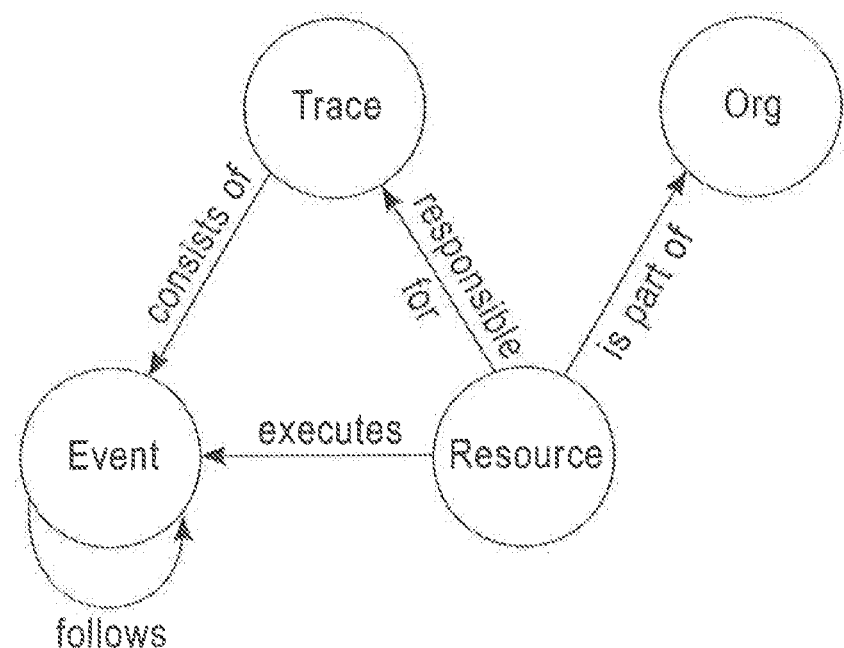
FIG. 1(b) illustrates an extended HIN model, according to embodiments of the disclosure.

These edge relations are generic enough to capture a wide variety of traces from different business process domains. Nevertheless, an HIN model according to an embodiment of the disclosure can be augmented with additional types of nodes and edges targeting a specific business process domain. For example, an extended HIN model, shown in FIG. 1(b), includes an additional node type "Department", and an edge type "is-part-of" which specifies the resource's belonging to the department relationship.

According to embodiments, given an HIN model described above, the following non-limiting list of meta-paths can be defined.
TET: Meta-path between two traces that share common event(s);
TRT: Meta-path between two traces that share common resource(s) executing events;
TEET: Meta-path between two traces that consist of consecutive events;
TERET: Meta-path between two traces that consist of events executed by the same resource.

Modeling Process Trace Temporal Semantics as Meta-Path in HIN

To model process trace temporal semantics according to an embodiment, an HIN needs to be extended with a temporal node type and an edge relationship needs to be defined between a trace node type and a temporal node type.

Setting temporal node values to be the start time of the process trace, where the process start time is set to be the start time of the first event in the trace, is inefficient because process traces run at different times and potentially lead to a separate temporal node per process traces. Thus, according to embodiments, the temporal node type value is set to be the difference between the current system time and a reference timestamp, which is a system parameter, and dividing them by a user chosen time granularity parameter. For example, let the reference start time be Jan. 1, 1970, the current system time be Apr. 1, 1970, and a user defined time granularity be 30 days. The temporal node values will be set to range from (Apr. 1, 1970-Jan. 1, 1970) Div 30. Thus we end up with only three nodes of values as opposed to potentially one node per process trace.

The above example highlights a temporal node granularity of 30 days (one month). Temporal nodes of different granularity can also be defined, e.g., days, week, quarter, six months, year, seasons, which provide the user with different semantic choices to incorporate in a trace clustering similarity measure.

According to embodiments of the disclosure, a relationship edge between a process trace node type and temporal node type can be defined as follows:
starts-on: A trace starts at a certain time.

To add a "starts-on" relationship edge between a process trace and a temporal node, the difference between the process start time and the reference timestamp (same timestamp as used above) is calculated, and the result is divided by the same user supplied parameter (same value as used above). The resulting value is the particular temporal node to which an edge needs to be created.

According to embodiments of the disclosure, after setting the edge and node relationships the following meta-path can be created, where T is shorthand for Trace, and S is shorthand for Time:
TST: Meta-path between two traces that share a common time range or affinity.

The "starts-on" relationship is an example from a broad class of possible temporal relationships. According to embodiments, other types of temporal relationships can be similarly defined, such as "ends-on": A trace ends at a certain time, and "joined-on": a particular resource became available.

Meta-Path Based Similarity Measure

According to embodiments of the disclosure, by modeling process traces' structural and temporal semantics as an HIN, a PathSim-based Similarity measure can be calculated based on multiple meta-paths. Path similarities can be obtained either by using an individual meta-path or a weighed combination of meta-paths using the following formula:

$$\sigma^*(x,y) = \Sigma_{P_i} w_i \times \sigma_{P_i}(x,y), \quad (1)$$

where $\sigma_{P_i}(x,y)$ is a PathSim-based similarity between two traces x and y via meta-path $P_i$, and $w_i$ is the weight associated with meta-path $P_i$.

According to embodiments, although a linear combination of multiple meta-paths results in better outcome than that of an individual meta-path, users may also select only a temporal meta-path or only a structural meta-paths.

After calculating the PathSim similarity between every pair of traces using EQ. (1), an off-the shelf clustering algorithm can be used to cluster the input process traces.

Modeling process traces as an HIN can capture a rich semantics of structural types of nodes and edges in the network. HINs, however, do not maintain the sequential order of events in each process trace. As a result, PathSim does not measure the similarity between traces that share similar execution order of events. For example, a PathSim based on a TEET meta-path can represent only the sequential relationship between two consecutive events. Since traces comprise a sequence of multiple events, traces sharing the same sequential execution should typically be "more" similar than traces that are not. A similarity measure should be able to capture the similarity between two sequences of events, i.e., two traces, in an HIN.

Edit distance similarity measures can quantify how similar two sequences are by counting the minimum number of operations required to transform one sequence into the other. Edit distance has shown its effectiveness in measuring similarity between sequence-like data traces in multiple domains, such as text mining, process mining, and bioinformatics.

Embodiments of the disclosure can provide a new similarity measure for HIN, referred to as SeqPathSim, that combines the rich semantic relationships between nodes captured by PathSim with the sequential similarity captured by edit distance. According to embodiments, SeqPathSim uses a generic edit-distance.

It is known that the performance of edit distance depends on how the cost of editing operations, such as replace, delete, and insert, is defined. For example, using a unit cost, such as Levenshtein's distance, has been shown to be effective in many string similarity tasks. Embodiments of the disclosure consider two types of editing costs: insertion/deletion cost, which is the cost to insert or delete an event before or after another event, and replacement cost, which is the cost to replace an event by another event. For insertion/deletion cost, embodiments can use the PathSim based similarity via an EE metapath, which include the paths between an event that follows another event, since this meta path captures how likely an event is executed before/after another event. For replacement cost, embodiments can use a combination of the PathSim based similarity via ERE, which is an Event-Resource-Event metapath that represents two events that are executed by the same resource, and ETE, which is an Event-Trace-Event metapath that represents events that are part of the same trace, since these meta-paths capture how likely two events are the same in general.

Similar to generic edit-distance, a sequential path similarity measure, denoted as SeqPathSim, between two traces $x=(a_1, a_2, \ldots, a_m)$ and $y=(b_1, b_2, \ldots, b_n)$, where $a_i, b_j \in E$, $1 \leq i \leq m$, $1 \leq j \leq n$, generates a matrix $v_{mn}(x,y)$, or $v_{m,n}$ for short, that is defined by the following recursive formula:

$$v_{m,n}(x, y) = \begin{cases} v_{m-1,n-1} & \text{for } a_m = b_n, \\ \min_v & \text{for } a_m \neq b_n, \end{cases} \quad (2)$$

with:

$$\min_v = \begin{cases} v_{m-1,n} + \sigma_{P_{EE}}(a_m, b_n) \\ v_{m,n-1} + \sigma_{P_{EE}}(a_m, b_n) \\ v_{m-1,n-1} + \sigma_{P_{ERE},P_{ETE}}(a_m, b_n) \end{cases}.$$

Optimizing SeqPathSim for High-Dimensional Process Traces

A SeqPathSim measure according to embodiments can leverage both the rich semantic relationships between nodes captured by PathSim and the sequential similarity by edit-distance, but also inherits the performance characteristics of edit distance-based measures. Recall that the complexity of a generic edit-distance is O(m×n), where m and n are the lengths of two compared sequences. The situation is further complicated by the need to calculate the similarities between every pairs of traces. Clustering real world traces that are often of high dimensionality, including up to hundreds of events per process trace, using a SeqPathSim according to embodiments can create computational bottlenecks.

Figure 2A:
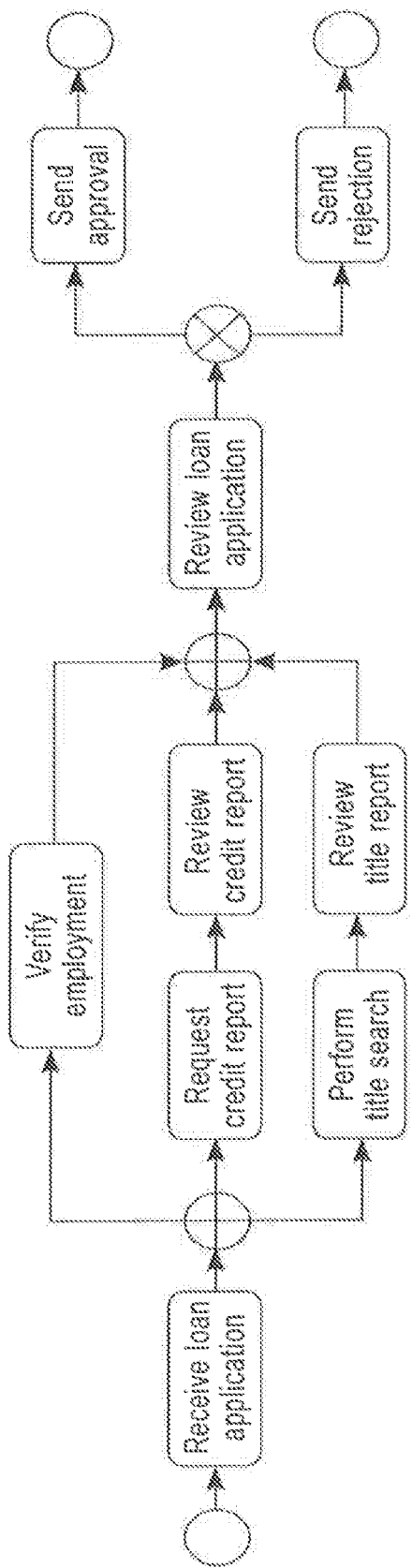
FIG. 2(a) illustrates an original representation of a loan application process model, according to embodiments of the disclosure.
Figure 2B:
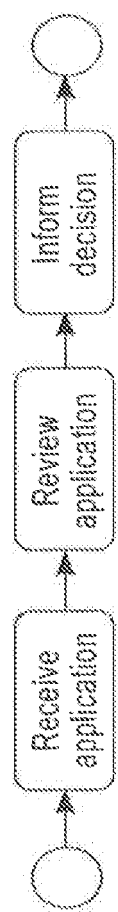
FIG. 2(b) shows the process model of FIG. 2(a) abstracted using fewer dimensions, according to embodiments of the disclosure.

Despite of the high number of dimensions, the comparing process traces do not require the traces to be represented at the fine-grained level of events. For example, FIG. 2(a) illustrates an original representation of a loan application process model which includes 9 types of events, receive loan application 201, verify employment 203, request credit report 205, review credit report 207, perform title search 209, review title report 211, review loan application 213, send approval 215, and send rejection 217. However, at a higher level of abstraction, the loan application process essentially includes three steps: receiving the application 221, reviewing the application 223, and informing a decision 225, where reviewing the application 223 includes steps 203 through 213, and informing a decision 225 includes both sending approval 215 and sending rejection 217. Therefore, the process model in FIG. 2(a) can be abstracted using fewer dimensions, i.e., three dimensions, as shown in FIG. 2(b). When using the new representation, it is still possible to compare and differentiate between process traces, that is, traces of applications under review vs. those already informed of decisions. In addition, the performance of a SeqPathSim on the new dimensions will be improved due to the decrease in dimensionality. In FIG. 2(b), the performance is improved by two thirds.

Traces Representation for Dimension Reduction

According to embodiments of the disclosure, before applying dimension reduction techniques to process traces, there should be an appropriate data representation for traces. The most common representation is based on a vector space model, in which each trace t is represented as a vector $t=(s_1, s_2, \ldots, s_{|E|})$, in which the value of each dimension $s_i$ is associated with a type of event $e_i \in E$ and equals the normalized frequency of the event $e_i$ in the trace t: $s_i = f_{e_i,t}$. This representation, although capturing the "local" importance of each event type to a trace via $f_{e_i,t}$, does not capture the "specificity" of each event type across all the traces.

Embodiments of the disclosure can provide a new data representation for process traces that captures both the local importance of each event and its specificity to a trace. In addition to a trace's event frequency, embodiments can consider the popularity of each event across all traces: $n_{e_i} = |\{t \in T, e_i \in t\}|$. Intuitively, the higher $n_{e_i}$ is, the more popular the event $e_i$ is and thus, the less specificity it is to a trace. As a result, according to embodiments of the disclosure, the value of each dimension in trace's vector $s_i$ is based on a combination of an event's frequency $f_{e_i,t}$, i.e., the event's local importance, and inverse event popularity, which represents specificity. According to embodiments of the disclosure, a new calculation of $s_i$ can be defined as follows:

$$s_i = \begin{cases} (1+\log(f_{e_i,t})) \times \log\left(\frac{|T|}{n_{e_i}}\right) & \text{if } e_i \in t, \\ 0 & \text{otherwise.} \end{cases} \quad (3)$$

According to embodiments, having represented process traces as vectors, the set of input traces T can be represented as a large matrix M, whose size is $|T| \times |E|$, and each element $M_{ij}$, $1 \leq i \leq |T|$, $1 \leq j \leq E$, is the value of the j-th dimension, the dimension associated with event type $e_j$ in the i-th trace.

Process Model-Regularized Trace Dimension Reduction

According to embodiments, off-the-shelf dimension reduction techniques can be applied to matrix M, such as non-negative matrix factorization (NMF), principle component analysis (PCA), or singular value decomposition (SVD), among others. The results of those techniques often include a matrix M', whose size equals $|T| \times \kappa$, $\kappa \ll |E|$, with $\kappa$ as the number of new dimensions that represents the original data on the new dimensions, where each row is a trace vector, and a matrix W, whose size equals $|E| \times \kappa$, that represents the mapping of the old dimensions to the new ones, i.e., each row is appropriate to the distribution of an event over the set of new dimensions.

According to embodiments of the disclosure, the results of existing techniques should not be used directly for an edit distance-based approach like SeqPathSim. According to embodiments of the disclosure, while SeqPathSim requires the input traces to be in form of sequences of events in the new dimensions, the above results only provide the "soft" mappings from the input events to the new dimensions in form of matrix W. Therefore, W should be transformed into a "hard" assignment of the original events into the new dimensions. Formally, according to embodiments, if $\kappa$ new dimensions are represented as a set of $\kappa$ clusters $C=\{C_i\}$, $1 \leq i \leq \kappa$, then a one-to-one mapping function $\rho: E \rightarrow C$ can be derived that maps each event $e \in E$ to a cluster in C. A mapping function $\rho$ according to an embodiment can maximize the collective similarities between pairs of events that belong to the same cluster.

This mapping can be represented as an optimization with the following objective function:

$$\operatorname{argmax}_\rho \Sigma_{\rho(e_j)=\rho(e_k)} sim(e_j, e_k) \quad (4)$$

where $sim(e_j, e_k)$ is a similarity between $e_j$ and $e_k$ on the new dimensions, such as a cosine similarity or a Euclidean distance-based similarity.

Deriving a "hard" assignment solely based on the result of the existing dimension reduction techniques, however, ignores the information about the relationships between events in a process model. According to embodiments, a process model can be obtained by projecting the process traces' heterogeneous graph G=(V, E) onto the set of event nodes E, denoted as $G_E=(V_E, E_E)$. Because a process model according to an embodiment can capture the follow-up relationships between events, since edge weights in a process model represent the number of times an event follows another event in a trace, it can provide strong indication in assigning events to clusters. For example, events that are frequently following each other are likely to be in the same cluster. Therefore, according to embodiments, another component, denoted as $\Delta$, is added to the objective function in EQ. (4) to account for the regularization based on the process model. According to an embodiment, $\Delta$ is used to maximize the collective similarities between pairs of events that follow one or the other in a process execution model. According to an embodiment, a new objective function for finding an optimal mapping $\rho$ is as follow:

$$\operatorname{argmax}_\rho (1-\lambda) \times \Sigma_{\rho(e_j)=\rho(e_k)} sim(e_j, e_k) + \lambda \times \Delta, \quad (5)$$

with $$\Delta = \Sigma_{(e_j,e_k) \in E_E} w(e_j, e_k) \times sim(e_j, e_k),$$

where $w(e_j, e_k)$ is the weight of the edge between $e_j$ and $e_k$ in process model $V_E$, and $\lambda$ is a user specified parameter to tune the preference between the statistical similarity on the new dimensions, i.e., the first component, and the regularization based on the process model, i.e., the second component.

The optimization in EQ. (5) is a variant of a set partitioning task and finding a feasible solution for such a optimization is NP-hard. Therefore, according to embodiments, a "greedy" algorithm is used to solve for the above optimization. First, a similarity matrix S is calculated from $$S_{jk} = sim'(e_j, e_k) = (1-\lambda) \times sim(e_j, e_k) + \lambda \times \sigma_{P_{EE}}(e_j, e_k), \quad (6)$$

where $\sigma_{P_{EE}}(e_j,e_k)$ is a PathSim-based similarity between $e_j$ and $e_k$ via meta-path EE, which is used to account for the sequential relationship between events in the process model, i.e., $\sigma_{P_{EE}}(e_j, e_k)$ can be considered as the local regularization term, similar to the role of $\Delta$ in EQ. (5), sim'$(e_j, e_k)$ is the new similarity measure between events that combines both statistical similarity, i.e., sim$(e_j,e_k)$, and sequential similarity, i.e., $\sigma_{P_{EE}}(e_j,e_k)$. Then, instead of finding a solution that optimizes the global objective, as in EQ. (5), an embodiment uses a local objective function where an event $e_j$ is assigned to a cluster, i.e., a new dimension, that contains the event closest to $e_j$:

$$\rho(e_j)=\rho(e^*) \text{ with respect to } e^*=\text{argmax}_{e_k \in E}\text{sim}'(e_j,e_k). \quad (7)$$

Process Trace Clustering Framework

Figure 3:
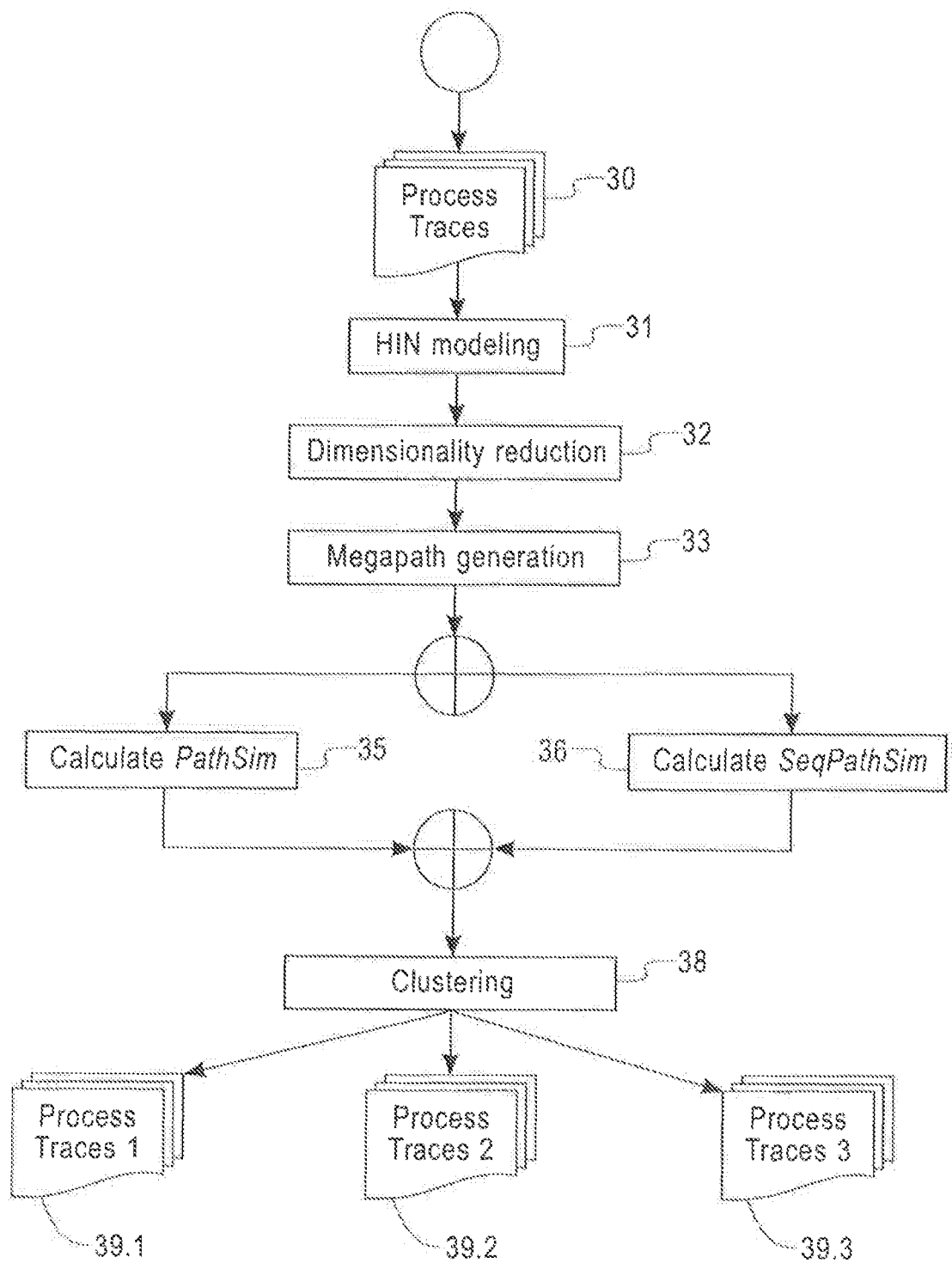
FIG. 3 illustrates a general process that generates process trace clusters, according to embodiments of the disclosure.

According to embodiments of the disclosure, FIG. 3 illustrates a general process that generates process trace clusters. According to embodiments, a process is generally iterative and relies on user feedback and allows a user to go back and forth between steps. Referring now to the figure, as process according to an embodiment begins at step 30 by receiving a set of process traces. According to embodiments, the process traces are application level event logs that are collected by an administrator through automation. The structural semantics of the process traces are modeled as an HIN at step 31. According to embodiments, the HIN modeling is extended to model temporal semantics in HIN as described above. At step 32, dimensionality reduction is performed on the cluster event types to generate new event type clusters. At step 33, users can generate one or multiple structural meta-paths using the higher-level reduced-dimension new event type clusters to perform clustering. According to embodiments, metapath selection is extended to allow users to combine structural and temporal meta-paths in addition to selecting temporal meta-path for clustering. Based on the new cluster types, a similarity calculation is calculated based on a structural path similarity at step 35, based on a sequential path similarity, at step 36, or both. After performing the similarity calculation, the process traces are clustered at step 38. According to embodiments, an off the shelf clustering algorithms can be used to cluster the process traces. The clustering process generates a plurality of disjoint partitions based on the clusters of new event types that maximizes the average fitness of each partition and minimizes the average complexity of each partition. Each partition is a graph model of a process in the application event log. The resulting clusters of process traces 39.1, 39.2, 39.3, . . . can be visualized for the user who then can determine whether to iterate a subset of the dataset, e.g., use the data of process traces in cluster 39.1 to recluster using a different set of metapaths.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 4:
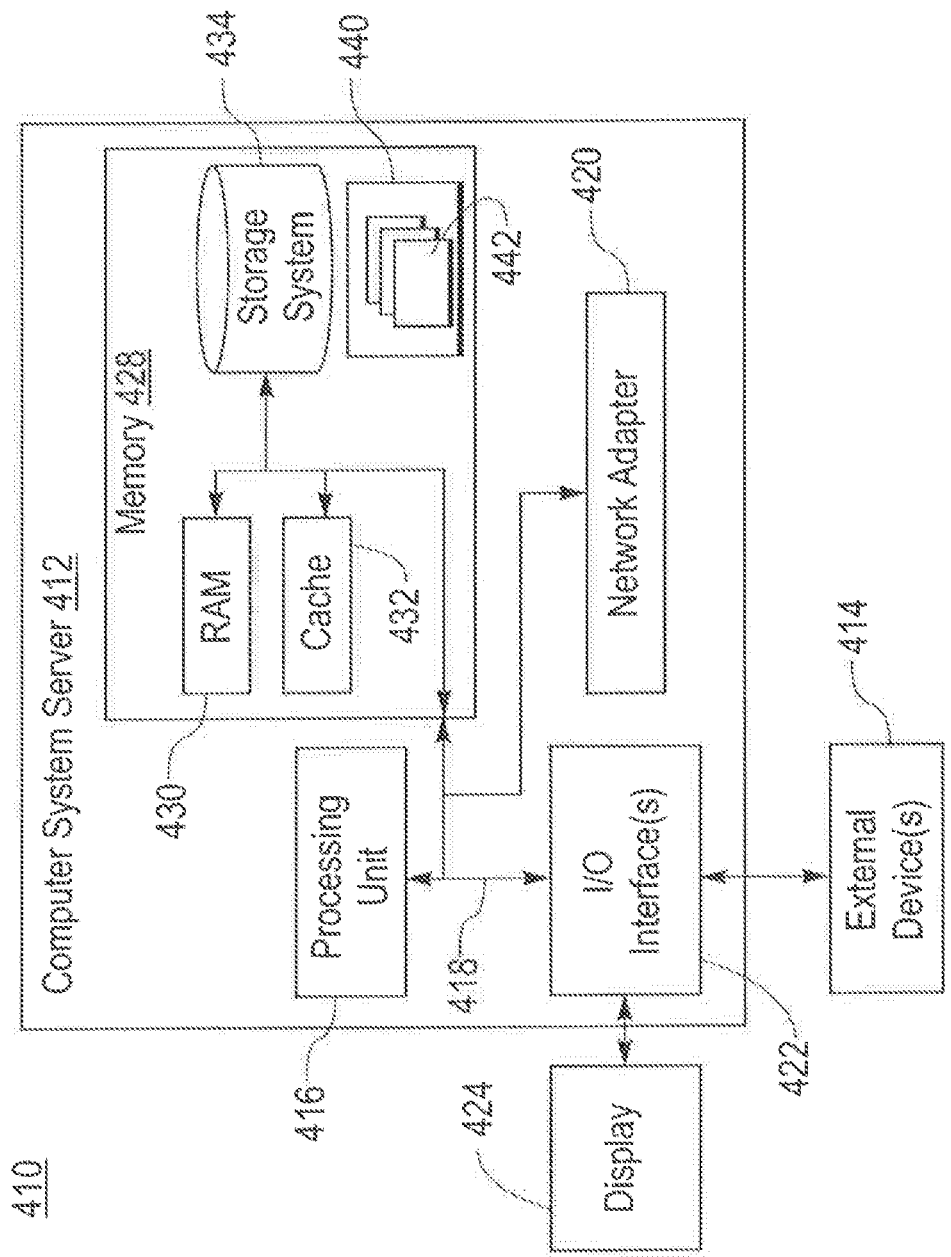
FIG. 4 is a schematic of an exemplary cloud computing node that implements an embodiment of the disclosure.

Referring now to FIG. 4, a schematic of an example of a cloud computing node is shown. Cloud computing node 410 is only one example of a suitable cloud computing node and is not intended to suggest any limitation as to the scope of use or functionality of embodiments of the disclosure described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the disclosure as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
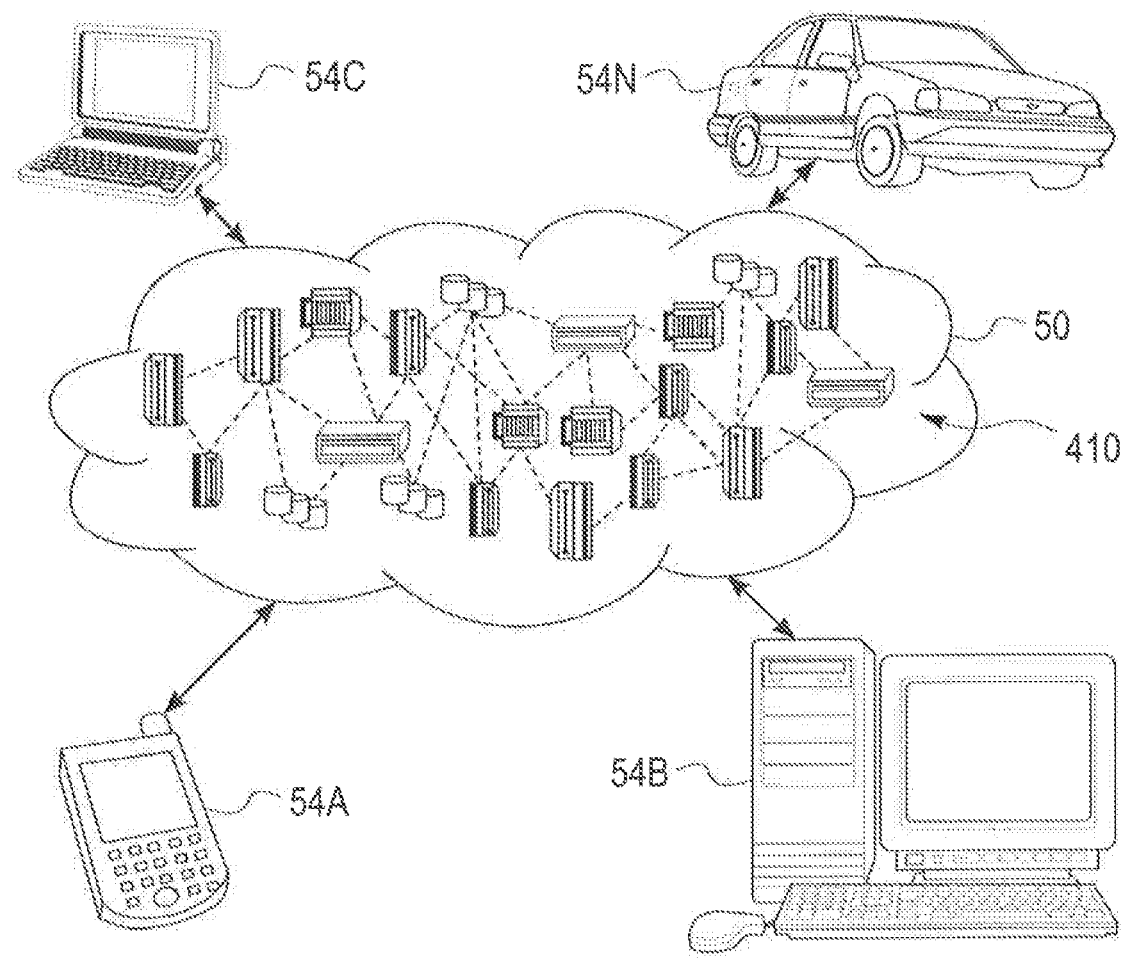
FIG. 5 shows an exemplary cloud computing environment according to embodiments of the disclosure.

Referring now to FIG. 5, illustrative cloud computing environment 50 is depicted. As shown, cloud computing environment 50 comprises one or more cloud computing nodes 400 with which local computing devices used by cloud consumers, such as, for example, personal digital assistant (PDA) or cellular telephone 54A, desktop computer 54B, laptop computer 54C, and/or automobile computer system 54N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 900 and cloud computing environment 50 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A computer-implemented method of generating process trace clusters, the method executed by a computer comprising the steps of:
    receiving a set of process traces, wherein a process trace is an application level event log of a business process from a computer system;
    receiving an identification of node types and edge types of the application event log to generate a heterogeneous information network (HIN) graph of the application event log, wherein node types of said HIN include events, traces and temporal nodes, wherein each trace is a finite sequence of event type nodes, wherein a temporal node type value is set to be a difference between a current system time and a reference timestamp, divided by a user chosen time granularity parameter,
    performing dimension reduction of the HIN by reducing a number of event types of the set of input traces to generate clusters of new event types;
    generating a set of meta-paths that connect nodes of a same reduced event type in the application event log;
    calculating similarities between process traces using the new event type clusters;
    clustering the set of process traces to generate a plurality of disjoint partitions based on the clusters of new event types, wherein each partition is a graph model of the business process in the application event log; and
    performing process mining on said graph models to determine whether events in the event log were executed in a correct sequence or to identify bottlenecks in the business process.

2. The method of claim 1, further comprising repeating said steps of receiving an identification of node types and edge types, generating a set of meta-paths, performing dimension reduction, calculating similarities, and clustering the set of process traces using one of said plurality of disjoint partitions as input.

3. The method of claim 1,
    wherein edge types of said HIN are associated with different types of interactions between different node types,
    wherein an edge relationship between a trace node type and a temporal node type includes a starts-on edge that indicates a start time of a trace, an ends-on edge that indicates an end time of a trace, and a joined-on edge that indicates a time when a particular resource became available to a trace.

4. The method of claim 1, wherein calculating similarities between process traces using the new event type clusters comprises calculating one or more of a structural metapath between new event type clusters and a temporal metapath between new event type clusters.

5. The method of claim 4, wherein a structural path similarity between each pair of events type clusters connected by a meta-path P is calculated using $$\sigma_P(e_j, e_k) = \frac{2 \times |\Gamma_P(e_j, e_k)|}{|\Gamma_P(e_j, e_j)| + |\Gamma_P(e_k, e_k)|}$$

wherein $e_j$ and $e_k$ represent event-type clusters and $\Gamma_P(e_j, e_k)$ is a set of paths from $e_j$ to $e_k$ following meta-path P, and $|\Gamma_P(\ )|$ represents a cardinality of the set of paths represented by $\Gamma_P(\ )$.

6. The method of claim 5, wherein a temporal path similarity between each pair of events type clusters connected by a meta-path P is calculated from SeqPathSim(x, y) of traces $x=(a_1, a_2, \ldots, a_m)$ and $y=(b_1, b_2, \ldots, b_n)$, wherein $a_i$, $b_i$ are event type clusters, wherein SeqPathSim(x, y) generates a matrix $v_{mn}(x, y)$ defined by $$v_{m,n}(x, y) = \begin{cases} v_{m-1,n-1}(x, y) & \text{for } a_m = b_n, \\ \min_v & \text{for } a_m \neq b_n, \end{cases}$$

with:

$$\min_v = \begin{cases} v_{m-1,n}(x, y) + \sigma_{P_{EE}}(a_m, b_n) \\ v_{m,n-1}(x, y) + \sigma_{P_{EE}}(a_m, b_n) \\ v_{m-1,n-1}(x, y) + \sigma_{P_{ERE}, P_{ETE}}(a_m, b_n) \end{cases}.$$

7. The method of claim 6, further comprising combining meta-path similarities using the following formula:

$$\sigma^*(x,y) = \Sigma_{P_i} w_i \times \sigma_{P_i}(x,y),$$

where $\sigma_{P_i}(x, y)$ is a similarity between two traces x and y via meta-path $P_i$, and $w_i$ is a weight associated with meta-path $P_i$.

8. A non-transitory program storage device readable by a computer, tangibly embodying a program of instructions executed by the computer to perform the method steps for generating process trace clusters, the method executed by a computer comprising the steps of:
    receiving a set of process traces, wherein a process trace is an application level event log of a business process from a computer system;
    receiving an identification of node types and edge types of the application event log to generate a heterogeneous information network (HIN) graph of the application event log, wherein node types of said HIN include events, traces and temporal nodes, wherein each trace is a finite sequence of event type nodes, wherein a temporal node type value is set to be a difference between a current system time and a reference timestamp, divided by a user chosen time granularity parameter;

performing dimension reduction of the HIN by reducing a number of event types of the set of input traces to generate clusters of new event types;

generating a set of meta-paths that connect nodes of a same reduced event type in the application event log;

calculating similarities between process traces using the new event type clusters;

clustering the set of process traces to generate a plurality of disjoint partitions based on the clusters of new event types, wherein each partition is a graph model of the business process in the application event log; and performing process mining on said graph models to determine whether events in the event log were executed in a correct sequence or to identify bottlenecks in the business process.

9. The computer readable program storage device of claim 8, the method further comprising repeating said steps of receiving an identification of node types and edge types, generating a set of meta-paths, performing dimension reduction, calculating similarities, and clustering the set of process traces using one of said plurality of disjoint partitions as input.

10. The computer readable program storage device of claim 8,
wherein edge types of said HIN are associated with different types of interactions between different node types,
wherein an edge relationship between a trace node type and a temporal node type includes a starts-on edge that indicates a start time of a trace, an ends-on edge that indicates an end time of a trace, and a joined-on edge that indicates a time when a particular resource became available to a trace.

11. The computer readable program storage device of claim 8, wherein calculating similarities between process traces using the new event type clusters comprises calculating one or more of a structural metapath between new event type clusters and a temporal metapath between new event type clusters.

12. The computer readable program storage device of claim 11, wherein a structural path similarity between each pair of events type clusters connected by a meta-path P is calculated using $$\sigma_P(e_j, e_k) = \frac{2 \times |\Gamma_P(e_j, e_k)|}{|\Gamma_P(e_j, e_j)| + |\Gamma_P(e_k, e_k)|}$$

wherein $e_j$ and $e_k$ represent event-type clusters and $\Gamma_P(e_j, e_k)$ is a set of paths from $e_j$ to $e_k$ following meta-path P, and $|\Gamma_P(\ )|$ represents a cardinality of the set of paths represented by $\Gamma_P(\ )$.

13. The computer readable program storage device of claim 12, wherein a temporal path similarity between each pair of events type clusters connected by a meta-path P is calculated from SeqPathSim(x, y) of traces $x=(a_1, a_2, \ldots, a_m)$ and $y=(b_1, b_2, \ldots, b_n)$, wherein $a_i$, $b_i$ are event type clusters, wherein SeqPathSim(x, y) generates a matrix $v_{mn}(x, y)$ defined by $$v_{m,n}(x, y) = \begin{cases} v_{m-1,n-1}(x, y) & \text{for } a_m = b_n, \\ \min_v & \text{for } a_m \neq b_n, \end{cases}$$

with:

$$\min_v = \begin{cases} v_{m-1,n}(x, y) + \sigma_{P_{EE}}(a_m, b_n) \\ v_{m,n-1}(x, y) + \sigma_{P_{EE}}(a_m, b_n) \\ v_{m-1,n-1}(x, y) + \sigma_{P_{ERE},P_{ETE}}(a_m, b_n) \end{cases}.$$

14. The computer readable program storage device of claim 13, the method further comprising combining meta-path similarities using the following formula:

$$\sigma^*(x,y) = \Sigma_{P_i} w_i \times \sigma_{P_i}(x,y),$$

where $\sigma_{P_i}(x, y)$ is a similarity between two traces x and y via meta-path $P_i$, and $w_i$ is a weight associated with meta-path $P_i$.

* * * * *